United States Patent
Isoda et al.

(10) Patent No.: US 7,420,186 B2
(45) Date of Patent: Sep. 2, 2008

(54) PHOSPHOR PANEL

(75) Inventors: Yuji Isoda, Ashigara-kami-gun (JP); Hiroshi Matsumoto, Ashigara-kami-gun (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

(21) Appl. No.: 11/238,987

(22) Filed: Sep. 30, 2005

(65) Prior Publication Data

US 2006/0065851 A1   Mar. 30, 2006

(30) Foreign Application Priority Data

Sep. 30, 2004   (JP)   ............................. 2004-288265

(51) Int. Cl.
*G03B 42/08* (2006.01)
*G21K 4/00* (2006.01)

(52) U.S. Cl. .................................................. 250/484.4

(58) Field of Classification Search ............... 250/484.4
See application file for complete search history.

(56) References Cited

U.S. PATENT DOCUMENTS

| | | | |
|---|---|---|---|
| 6,483,122 B1 * | 11/2002 | Maezawa et al. ............ 250/582 |
| 2004/0149929 A1 * | 8/2004 | Miyake .................. 250/484.4 |
| 2005/0258377 A1 * | 11/2005 | Nakano et al. ........... 250/484.4 |

* cited by examiner

*Primary Examiner*—David P. Porta
*Assistant Examiner*—Mindy Vu
(74) *Attorney, Agent, or Firm*—Sughrue Mion, PLLC

(57) ABSTRACT

A phosphor panel favorably employable for medical diagnosis of chest has a phosphor layer formed on a substrate by a gas phase-accumulation method, in which the phosphor layer is composed of a large number of phosphor columns standing parallel to each other, in which the phosphor columns have a mean diameter of 0.1 to 50 μm at a top surface thereof, and there are no phosphor columns having a diameter larger than 200 μm at the top surface.

5 Claims, 4 Drawing Sheets

PHOSPHOR PANEL

FIELD OF THE INVENTION

The present invention relates to a radiation image storage panel favorably employable in a radiation image recording and reproducing method utilizing an energy-storing phosphor. The invention further relates to a process for preparation of the radiation image storage panel.

BACKGROUND OF THE INVENTION

When an energy-storing phosphor (e.g., stimulable phosphor, which gives off stimulated emission) is exposed to radiation such as X-rays, it absorbs and stores a portion of the radiation energy. The phosphor then emits stimulated emission according to the level of the stored energy when exposed to electromagnetic wave such as visible or infrared light (i.e., stimulating light). A radiation image recording and reproducing method utilizing the energy-storing phosphor has been widely employed in practice. In that method, a radiation image storage panel, which is a sheet comprising the energy-storing phosphor, is used. The method comprises the steps of: exposing the storage panel to radiation having passed through an object or having radiated from an object, so that radiation image information of the object is temporarily recorded in the panel; sequentially scanning the storage panel with a stimulating light such as a laser beam to emit stimulated light; and photoelectrically detecting the emitted light to obtain electric image signals. The storage panel thus treated is subjected to a step for erasing radiation energy remaining therein, and then stored for the use in the next recording and reproducing procedure. Thus, the radiation image storage panel can be repeatedly used.

The radiation image storage panel (often referred to as energy-storing phosphor sheet) has a basic structure comprising a support and a phosphor layer provided thereon.

Various kinds of energy-storing phosphor layers are known. For example, the phosphor layer can comprise a binder and energy-storing phosphor particles dispersed therein, or otherwise can comprise agglomerate of an energy-storing phosphor without binder. The latter layer can be formed by a gas phase-accumulation method or by a firing method.

The radiation image recording and reproducing method (or radiation image forming method) has various advantages as described above. It is still desired that the radiation image storage panel used in the method have as high sensitivity as possible and, at the same time, give a reproduced radiation image of as high quality (in regard to sharpness and graininess) as possible.

For the purpose of improving the sensitivity and the image quality, it has been proposed to form the phosphor layer by a gas phase-accumulation method such as vapor-deposition method or sputtering method. For example, in the vapor-deposition method, the phosphor or constitutional material thereof is heated by a resistance heater or electron beam, vaporized and accumulated on a substrate (e.g., metal plate) to prepare a phosphor layer in which a large number of columns of the phosphor stand parallel to each other. Thus prepared phosphor layer consists of only the phosphor without binder, and there are cracks among the phosphor columns. Accordingly, the stimulating light can be applied efficiently enough, and the emission can be collected also efficiently enough to improve the sensitivity. In addition, since the stimulating light is kept from scattering horizontally, an image of high sharpness can be obtained.

WO 02/20868A1 describes that an alkali halide (e.g., CsBr:Eu) phosphor layer formed by the vapor-deposition method is liable to have an uneven thickness because large phosphor particles are often formed to make uneven spots on the phosphor layer. On the basis of this finding, the WO publication proposes that, after at least 30 wt. % of the phosphor used as the evaporation source is deposited on a substrate, the formed phosphor layer be ground with abrasive to give a phosphor layer having even thickness.

As described above, a phosphor layer formed by a gas phase-accumulation method such as the vapor-deposition method consists of phosphor in the form of columns. According to the WO publication, the phosphor column has a diameter of some micrometers on average at its top surface. The phosphor column, however, does not always uniformly grow. For example, a portion of the phosphor column often grows anomalously, and neighboring phosphor columns may fuse and combine with each other. The present applicants have found that, if the anomalously grown or fused phosphor column (anomalous crystal, often referred to as "hillock") has a larger diameter at its top surface than a pixel size for reading out a radiation image or than an image size in reproducing the image, it causes a point defect to impair quality of the reproduced image and, as a result, to give unfavorable effects to various diagnoses and examinations.

FIG. 1 is an electron micrograph (×150) partly showing a surface of phosphor layer of a conventional radiation image storage panel, and FIG. 2 is another electron micrograph (×500) partly showing a section of the phosphor layer. As shown in FIGS. 1 and 2, in the phosphor layer formed by the conventional vapor-deposition process, some phosphor columns anomalously grow to become an anomalous crystal having a diameter larger than 200 μm at the top surface thereof.

FIG. 3 is still another electron micrograph (×35) partly showing a radiation image reproduced from the conventional storage panel. FIG. 3 indicates that, if the radiation image information is read out from this storage panel (pixel size: 100 μm, image size: 200 μm), the anomalous crystal in the phosphor layer gives a point defect which is unfavorable for medical diagnoses.

This problem is serious particularly in medical radiography for the chest. In radiographic diagnoses of chest, the pixel size for reading out a radiation image from the storage panel is generally 100 μm pitch while the image size for reproducing the image is 200 μm pitch. Accordingly, in the case where the storage panel is used for medical diagnoses of chest, the phosphor column having a diameter larger than 200 μm at its top surface causes serious troubles.

SUMMARY OF THE INVENTION

It is an object of the present invention to provide a radiation image storage panel giving a radiation image of high quality.

It is another object of the invention to provide a process for preparation of a radiation image storage panel giving a radiation image of high quality.

The applicant has studied the above problem, and found that the anomalous crystal (which is generally an aggregate of the phosphor columns fused in the vicinity of their top surfaces) does not form if the evaporation source before vaporized is subjected to a pretreatment in which the whole evaporation source is heated to melt so as to prevent bumping and splashing.

The present invention resides in a radiation image storage panel having a phosphor layer formed on a substrate by a gas phase-accumulation method, wherein the phosphor layer comprises a large number of phosphor columns standing parallel to each other, in which the phosphor columns have a mean diameter in the range of 0.1 to 50 μm at a top surface thereof, and there are no phosphor columns having a diameter larger than 200 μm at the top surface.

The radiation image storage panel of the invention can be produced by a process comprising the steps of:

placing, in a vacuum evaporation-deposition apparatus, a container containing an evaporation source containing phosphor or a constitutional materials thereof, evacuating the evaporation-deposition apparatus to set an inner atmosphere thereof at a pressure in the range of 0.1 to 10 Pa, preheating the container to melt whole evaporation source at the above-mentioned pressure range, and vaporizing the evaporation source to deposit on a substrate a phosphor layer having predetermined thickness.

In the above process, the whole evaporation source is fully heated to melt (in the pretreatment) before vaporized and thereby the phosphor columns are effectively prevented from growing anomalously, so that the resultant phosphor layer substantially contains no anomalous crystal and accordingly so that no point defect is observed in the reproduced radiation image. Since the phosphor layer contains essentially no anomalous crystal (i.e., anomalously grown phosphor column having a diameter larger than 200 μm at its top surface), the radiation image storage panel of the invention gives a radiation image of high quality and accordingly can be advantageously used in medical diagnoses, particularly in radiographic diagnoses of chest.

DETAILED DESCRIPTION OF THE INVENTION

Figure 1:
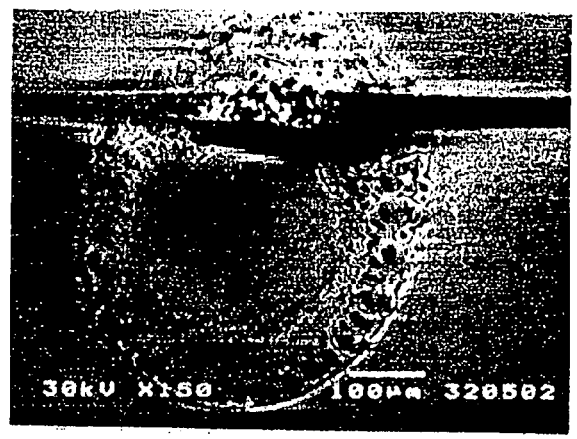
FIG. 1 is an electron micrograph showing a portion of the surface of phosphor layer of a conventional radiation image storage panel.
Figure 2:
FIG. 2 is another electron micrograph showing a portion of the section of phosphor layer of a conventional radiation image storage panel.
Figure 3:
FIG. 3 is still another electron micrograph showing a portion of a radiation image reproduced from a conventional radiation image storage panel.

Preferred embodiments of the invention are described below.

(1) In the phosphor layer, there are no phosphor columns having a diameter larger than 100 μm at the top surface.

(2) The phosphor column having the largest diameter at the top surface is an aggregate of phosphor columns fused in the vicinity of their top surfaces.

(3) The phosphor is an energy-storing phosphor.

In the radiation image storage panel of the invention, the phosphor layer preferably contains essentially no anomalous crystal (anomalously grown phosphor column) having a diameter larger than 100 μm at its top surface.

The radiation image storage panel of the invention is preferably used for medical diagnoses of chest.

In the pretreatment step of the process according to the invention, the container charged with an evaporation source is preferably heated to a temperature higher than the vaporizing temperature (at which the evaporation source is vaporized in the evaporation-deposition procedure). It is particularly preferred to heat the container for 2 to 20 minutes at the temperature $T_p$ °C., which is higher than the vaporizing temperature and which satisfies the following condition (1):

$$T_m+10<T_p<T_m+150 \tag{1}$$

in which $T_p$ is a temperature (° C.) at which the evaporation source is subjected to the pretreatment and $T_m$ is a melting point (° C.) of the evaporation source.

Otherwise, in the pretreatment step, the container charged with the evaporation source is preferably heated almost at the melting point $T_m$ (° C.) for 15 to 300 minutes, and then further heated at the vaporizing temperature for 5 to 120 minutes. The temperature is preferably increased at a rate of 10° C./minute or less.

In the pretreatment step, the temperature distribution in the container filled with the evaporation source (i.e., difference between the temperatures at the center and at the periphery of the melted source in the container) is preferably not more than 30° C.

During the evaporation-deposition procedure, a particle of the substance vaporized from the evaporation source comes into collision with an atmospheric gas molecule in the evaporation-deposition apparatus preferably at least once at most 1,000 times before deposited on the substrate.

The evaporation-deposition procedure is preferably carried out using a resistance heater.

In the following description, the phosphor layer of the radiation image storage panel according to the invention is explained in detail.

The radiation image storage panel of the invention has a phosphor layer formed on a substrate by a gas phase-accumulation method. Thus formed phosphor layer comprises a large number of phosphor columns standing parallel to each other, and the diameter of each phosphor column at the top surface is at most not larger than 200 μm.

For effectively preventing the emission from diffusing, a gap between neighboring phosphor columns (particularly, near the surface of the phosphor layer) is preferably more than ⅓ of the wavelength of the stimulated emission, and, in other words, preferably is in the range of 100 nm to 5 μm. The height of phosphor column (i.e., thickness of the phosphor layer) generally is in the range of 50 to 1,000 μm, preferably in the range of 200 to 700 μm.

The process for preparation of the radiation image storage panel according to the invention is explained in detail, by way of example, in the case where the phosphor is an energy-storing phosphor and where the phosphor layer is formed by vapor-deposition method performed using a resistance heater.

The substrate on which the deposited phosphor layer is to be formed is generally used as a support of the storage panel, and hence can be optionally selected from known materials conventionally used as a support of storage panel. The substrate is preferably a sheet of quartz glass, sapphire glass; metal such as aluminum, iron, tin or chromium; or resin such as aromatic polyimide. For improving the sensitivity or the image quality (e.g., sharpness and graininess), known auxiliary layers such as a light-reflecting layer (which contains a light-reflecting material such as titanium dioxide) and a light-absorbing layer (which contains a light-absorbing material such as carbon black) can be optionally provided according to the aim and use of the storage panel. Further, in order to promote growth of the columnar crystals, a great number of very small convexes or concaves may be provided on the substrate surface (or on the auxiliary layer such as an undercoating (adherent) layer, a light-reflecting layer or a light-absorbing layer, if provided) on which the vapor is to be deposited.

It is preferred that the energy-storing phosphor is a stimulable phosphor giving off stimulated emission in the wavelength region of 300 to 500 nm when exposed to stimulating rays in the wavelength region of 400 to 900 nm.

Particularly preferred is an alkali metal halide stimulable phosphor represented by the following formula (I):

$$M^I X \cdot a M^{II} X'_2 \cdot b M^{III} X''_3 : zA \quad (I)$$

in which $M^I$ is at least one alkali metal selected from the group consisting of Li, Na, K, Rb and Cs; $M^{II}$ is at least one alkaline earth metal or divalent metal selected from the group consisting of Be, Mg, Ca, Sr, Ba, Ni, Cu, Zn and Cd; $M^{III}$ is at least one rare earth element or trivalent metal selected from the group consisting of Sc, Y, La, Ce, Pr, Nd, Pm, Sm, Eu, Gd, Tb, Dy, Ho, Er, Tm, Yb, Lu, Al, Ga and In; A is at least one rare earth element or metal selected from the group consisting of Y, Ce, Pr, Nd, Sm, Eu, Gd, Tb, Dy, Ho, Er, Tm, Yb, Lu, Mg, Cu and Bi; each of X, X' and X" is independently at least one halogen selected from the group consisting of F, Cl, Br and I; and a, b and z are numbers satisfying the conditions of $0 \leq a < 0.5$, $0 \leq b < 0.5$ and $0 < z < 1.0$, respectively.

The number represented by z in the formula (I) preferably satisfies the condition of $1 \times 10^{-4} \leq z \leq 0.1$. The phosphor of the formula (I) preferably contains at least Cs as $M^I$ and at least Br as X. In the formula (I), A is preferably Eu or Bi, more preferably Eu. Further, the phosphor of the formula (I) can contain metal oxides such as aluminum oxide, silicon dioxide and zirconium oxide, if needed, in an amount of 0.5 mol or less per 1 mol of $M^I X$.

It is also preferred to use a rare earth activated alkaline earth metal fluoride halide stimulable phosphor represented by the following formula (II):

$$M^{II} FX : zLn \quad (II)$$

in which $M^{II}$ is at least one alkaline earth metal selected from the group consisting of Ba, Sr and Ca; Ln is at least one rare earth element selected from the group consisting of Ce, Pr, Sm, Eu, Tb, Dy, Ho, Nd, Er, Tm and Yb; X is at least one halogen selected from the group consisting of Cl, Br and I; and z is a number satisfying the condition of $0 < z \leq 0.2$.

In the formula (II), $M^{II}$ preferably comprises Ba more than half of the total amount of $M^{II}$, and Ln is preferably Eu or Ce. The $M^{II} FX$ in the formula (II) represents a matrix crystal structure of BaFX type, and hence it by no means indicates stoichiometrical composition of the phosphor though appearing F:X=1:1. It is generally preferred that the BaFX type crystal have many $F^+(X^-)$ centers corresponding to vacant lattice points of $X^-$ ions since they increase the efficiency of stimulated emission in the wavelength region of 600 to 700 nm. In that case, F is often slightly in excess of X Still also preferred is a rare earth activated alkaline earth metal sulfide stimulable phosphor represented by the following formula (III):

$$M^{II} S : A, Sm \quad (III)$$

in which $M^{II}$ is at least one alkaline earth metal selected from the group consisting of Mg, Ca and Sr; and A is preferably Eu and/or Ce.

Further, yet another preferred phosphor is a cerium activated trivalent metal oxide halide stimulable phosphor represented by the following formula (IV):

$$M^{II} OX : Ce \quad (IV)$$

in which $M^{II}$ is at least one rare earth element or trivalent metal selected from the group consisting of Pr, Nd, Pm, Sm, Eu, Th, Dy, Ho, Er, Tm, Yb and Bi; and X is at least one halogen selected from the group consisting of Cl, Br and I.

The phosphor used in the invention is not restricted to the energy-storing phosphor. It may be a phosphor absorbing radiation such as X-rays and instantly giving off (instant) emission in the ultraviolet or visible resin. Examples of that phosphor include phosphors of $LnTaO_4$:(Nb, Gd) type, $Ln_2SiO_5$:Ce type and LnOX:Tm type (Ln is a rare earth element); CsX (X is a halogen) type; $Gd_2O_2S$:Tb; $Gd_2O_2S$:Pr,Ce; $ZnWO_4$; $LuAlO_3$:Ce; $Gd_3Ga_5O_2$:Cr, Ce; and $HfO_2$.

In the case where the vapor-deposited phosphor layer is formed by multi-vapor deposition (co-deposition), at least two evaporation sources are used. One of the sources contains matrix material of the energy-storing phosphor, and the other contains activator material. The multi-vapor deposition is preferred because the vaporization rate of each source can be independently controlled to incorporate the activator uniformly in the matrix even if the materials have very different melting points or vapor pressures. According to the composition of the desired phosphor, each evaporation source may consist of the matrix material or the activator material only or otherwise may be a mixture thereof with additives. Three or more sources can be used. For example, in addition to the above sources, another evaporation source containing additives may be used.

The matrix material of the phosphor may be either the matrix compound itself or a mixture of two or more matrix constitutional materials, that is, substances that react with each other to produce the matrix compound. The activator material generally is a compound containing an activating element, and hence is, for example, a halide or oxide of the activating element.

If the activator is Eu, the Eu-containing compound of the activator material preferably contains $Eu^{2+}$ as much as possible because the desired stimulated emission (even if, instant emission) is emitted from the phosphor activated by $Eu^{2+}$. Since contaminated with oxygen, commercially available Eu-containing compounds generally contain both $Eu^{2+}$ and $Eu^{3+}$. The Eu-containing compounds, therefore, are preferably melted under Br gas-atmosphere so that oxygen-free $EuBr_2$ can be prepared to use.

The evaporation source preferably contains water only in an amount of 0.5 wt. % or less. For preventing the source from bumping, it is particularly important to control the water content at a low level if the material of matrix or activator is a hygroscopic substance such as EuBr or CsBr. The materials are preferably dried by heating at 100 to 300° C. under reduced pressure. Otherwise, the materials may be heated under dry atmosphere such as nitrogen gas atmosphere to melt at a temperature above the melting point for several minutes to several hours.

The evaporation source, particularly the source containing the matrix material, contains impurities of alkali metal (alkali metals other than ones constituting the phosphor) preferably only in a content of 10 ppm or less and impurities of alkaline earth metal (alkaline earth metals other than ones constituting the phosphor) preferably in a content of 5 ppm or less (by weight). That is particularly preferred if the phosphor is an alkali metal halide stimulable phosphor represented by the formula (I). Such preferred evaporation source can be prepared from materials containing the impurities little.

Figure 4:
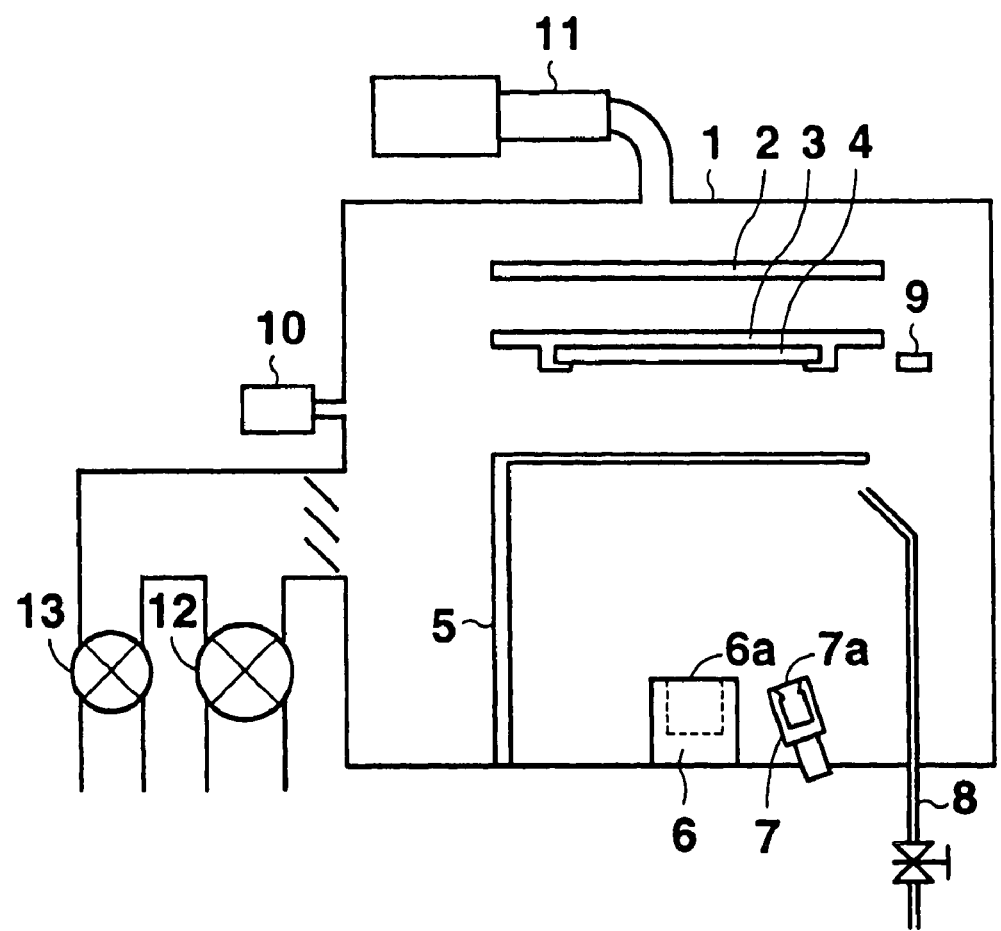
FIG. 4 is a sectional view schematically illustrating an example of the evaporation-deposition apparatus used in the invention.

In the present invention, the phosphor layer can be formed, for example, in the evaporation-deposition apparatus shown in FIG. 4. The apparatus is equipped with resistance-heating units.

FIG. 4 is a sectional view schematically illustrating an example of the evaporation-deposition apparatus employable for preparing the radiation image storage panel of the invention. The apparatus shown in FIG. 4 comprises a chamber 1, a substrate heater 2, a substrate holder 3, a shutter 5, resistance-heating units 6 and 7, heating containers 6a and 7a, a gas-intake pipe 8, a deposition rate monitor 9, a vacuum gauge 10, a gas analyzer 11, a main exhaust valve 12, and an auxiliary exhaust valve 13.

In the apparatus shown in FIG. 4, two or more evaporation sources are placed in the heating containers 6a and 7a equipped with the resistance-heating units 6 and 7, respectively. The substrate 4 is mounted on the substrate holder 3. The chamber 1 is then evacuated through the main exhaust valve 12 and the auxiliary exhaust valve 13, to make the inner pressure in the range of 0.1 to 10 Pa, preferably 0.1 to 4 Pa (medium vacuum). Preferably after the chamber 1 is further evacuated to make the inner pressure in the range of $1\times10^{-5}$ to $1\times10^{-2}$ Pa (high vacuum), an inert gas such as Ar, Ne or $N_2$ gas is introduced through the intake pipe 8 so that the inner pressure may be in the range of 0.1 to 10 Pa, preferably 0.1 to 4 Pa. In this way, partial pressures of water and oxygen can be reduced. The degree of vacuum in the chamber 1 is monitored by means of a vacuum gauge 10, and the partial pressures of gases are monitored by means of a gas analyzer 11. The chamber 1 can be evacuated by means of an optional combination of, for example, a rotary pump, a turbo molecular pump, a cryo pump, a diffusion pump and a mechanical buster.

In the process of the invention, the evaporation source is subjected to the pretreatment before vaporized. In the pretreatment, the heating container 6a (or 7a) filled with the evaporation source is heated at a temperature not lower than both the melting point and the vaporizing temperature of the evaporation source in the evaporation-deposition procedure so as to completely melt the evaporation source. Since the columnar crystal (phosphor column) is constituted of a matrix of the phosphor, at least the evaporation source containing the matrix material must be subjected to the pretreatment. In contrast, the activator is contained in a very small amount, and accordingly pretreatment (i.e., preheating) of the evaporation source containing the activator material is not always needed. Preferred examples of the pretreatment in the invention are as follows.

(Pretreatment 1)

An electric current is supplied to the heating unit 6, so as to heat the container 6a (or 7a) filled with the matrix evaporation source at a temperature not lower than the melting point $T_m°$ C. of the source and higher than the vaporizing temperature T° C. of the source in the evaporation-deposition procedure. For example, in the case where the matrix material is CsBr, its melting point $T_m$ and the vaporizing temperature T are 636(° C.) and 680(° C.) under medium vacuum (0.1 to 10 Pa), respectively. Preferably, the matrix source is heated at the temperature $T_p°$ C., which is higher than the vaporizing temperature T° C. and which satisfies the following condition (1):

$$T_m+10<T_p<T_m+150 \qquad (1)$$

in which $T_p$ is a temperature (° C.) at which the evaporation source is subjected to the pretreatment and $T_m$ is a melting point (° C.) of the evaporation source. The time to keep the temperature is generally 2 to 20 minutes, preferably 5 to 15 minutes.

For example, the container filled with the evaporation source is heated with the temperature gradually increasing for 3 to 30 minutes to about 300° C. Further, the temperature is gradually increased for 0.5 to 30 minutes to $T_p°$ C., kept at $T_p°$ C. for 2 to 20 minutes (preferably 5 to 15 minutes), and then gradually decreased 0.5 to 30 minutes to the vaporizing temperature T° C.

Figure 5:
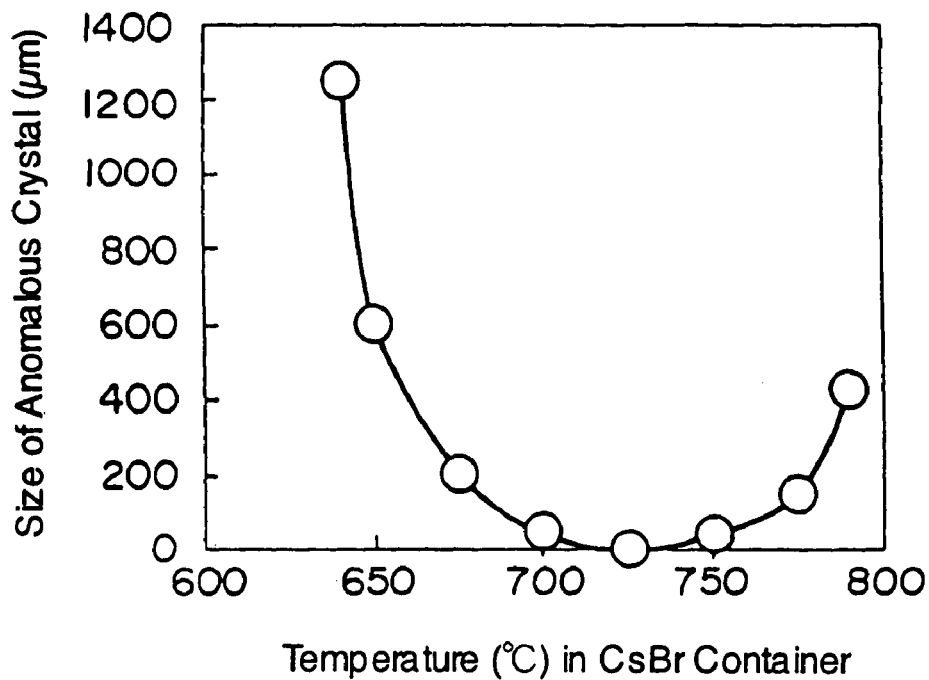
FIG. 5 is a graph showing the relationship between the size of anomalous crystal and the inner temperature of the container filled with CsBr evaporation source.
Figure 6:
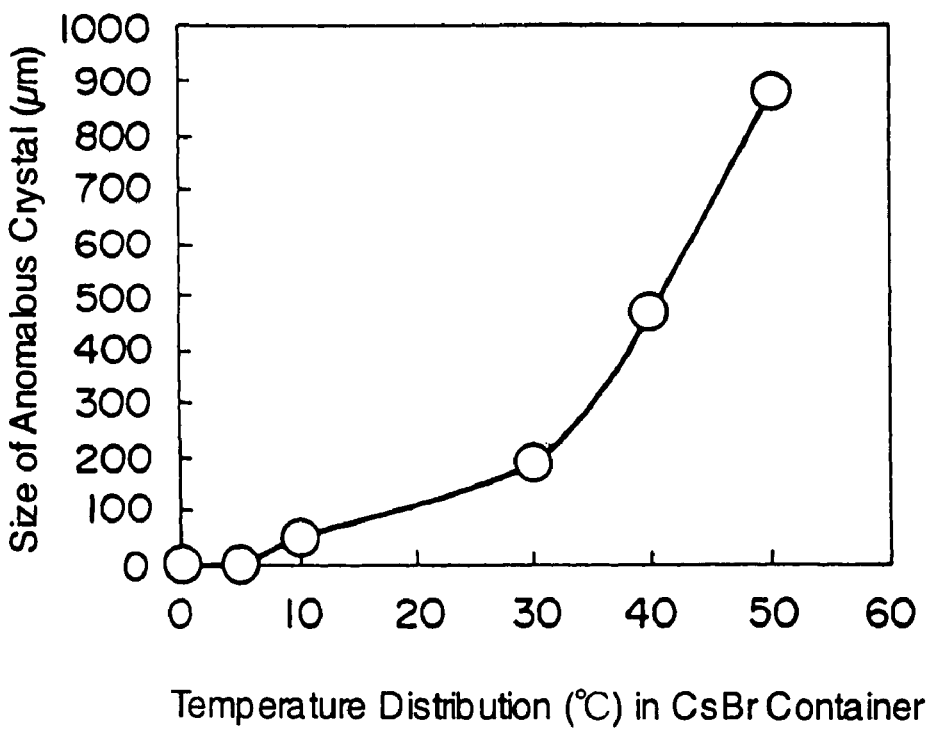
FIG. 6 is a graph showing the relationship between the size of anomalous crystal and the inner temperature distribution of the container filled with CsBr evaporation source.
Figure 7:
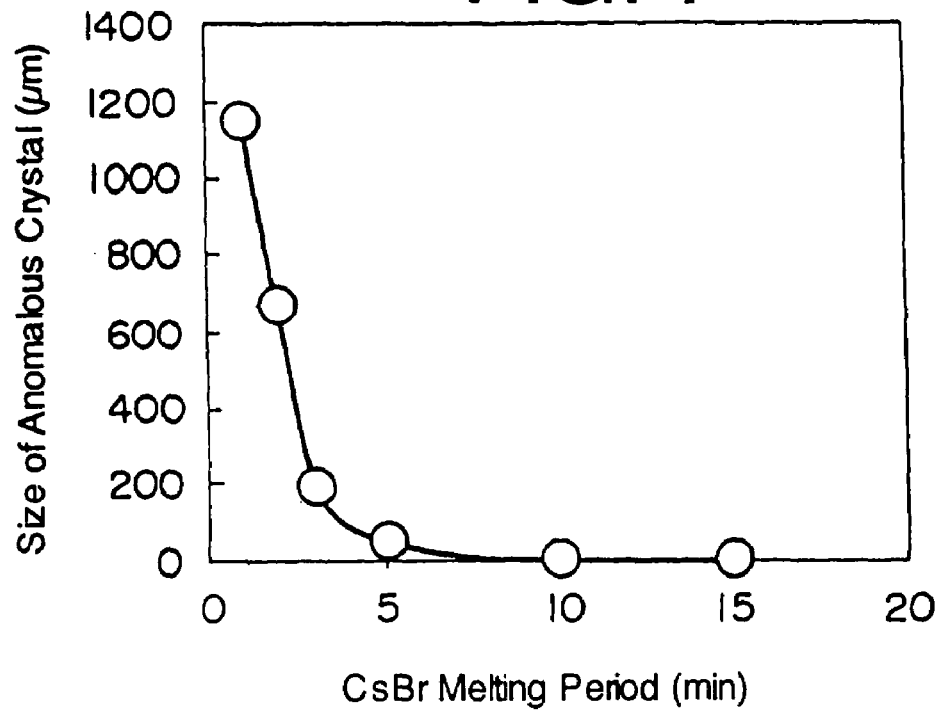
FIG. 7 is a graph showing the relationship between the size of anomalous crystal and the melting period of time of CsBr evaporation source.

Each of FIGS. 5 to 7 shows the relationship between each condition of the pretreatment (i.e., preheating) and the size of anomalous crystal observed on the surface of CsBr:Eu phosphor layer.

FIG. 5 is a graph showing the relationship between the average temperature (° C.) of CsBr evaporation source and the diameter (μm) of the largest phosphor column at its top surface. FIG. 5 indicates that the highest pretreatment temperature $T_p$ of the CsBr source ($T_m$=636° C.) is preferably controlled in the above range (1).

FIG. 6 is a graph showing the relationship between the anomalous diameter of phosphor column (diameter at the top surface: μm) and the temperature distribution of the container filled with CsBr evaporation source (i.e., difference between the temperatures in the melted evaporation source at the center of the source and at the position near the inner wall of the container). FIG. 6 indicates that the temperature distribution of melted source in the container is preferably 30° C. or below, more preferably 10° C. or below.

FIG. 7 is a graph showing the relationship between the anomalous diameter (μm) of phosphor column and the melting time (minute) of CsBr evaporation source. FIG. 7 indicates that the melting period of time preferably is 3 to 15 minutes. Therefore, the above-mentioned retaining period of time (for which the evaporation source is preferably heated at the highest temperature $T_p°$ C.) is determined.

(Pretreatment 2)

An electric current is supplied to the heating unit 6, so as to heat the container 6a (or 7a) filled with the matrix evaporation source almost at the melting point $T_m°$ C. of the source for 15 to 300 minutes (preferably 30 to 300 minutes). The temperature is then elevated to the vaporizing temperature T° C. in the evaporation-deposition procedure, and kept for 5 to 120 minutes, preferably 15 to 120 minutes, so as to heat the container at the vaporizing temperature T° C. The temperature is preferably increased at a rate of 10° C./minute or less.

In the evaporation-deposition procedure, bumping or splashing of the substance vaporized from the evaporation source is thought to initiate anomalous crystal growth, which is then promoted by fluctuation of the vaporized particles. Thus anomalously grown phosphor crystal causes the point defect. The size of the anomalous crystal (hillock, anomalously grown phosphor column or aggregate of phosphor columns fused near their top surfaces to combine with each other) depends on the size of initial anomalous crystal (caused by bumping or splashing), the shape of anomalous crystal and the thickness of deposited layer. If the evaporation source is fully melted in the above pretreatment, it can be prevented from serious bumping and splashing.

On the other hand, the fluctuation of vaporized particles (vapor flow) can be suitably controlled by regulating the collision frequency (which means how many times a particle vaporized from the source comes into collision with a molecule of atmospheric gas such as inert gas in the apparatus before deposited on the substrate). The collision frequency can be calculated in the following manner. If the vaporization attains equilibrium and the vapor flow behaves as a viscoelastic fluid, the random walk theory gives the following formula (2):

$$(t/\tau) = (LTS/\lambda)^2 \quad (2)$$

in which LTS is the distance (m) between the substrate and the evaporation source, $\lambda$ is the mean free path (m), t is the time (second) it takes for the particle vaporized from the source to reach the substrate, and $\tau$ is the time (second) it takes for the vaporized particle to cover the mean free path.

The mean free path $\lambda$ depends on the pressure of atmospheric gas in the apparatus, and is represented by the following formula (3):

$$\lambda = \{kT(\mu/m_a)^{1/2}\}/(\pi P_b d_{ab}^2) \quad (3)$$

in which k is Boltzmann constant, T is the temperature (K) of vaporized molecule, $m_a$ is the mass of vaporized molecule, $\mu$ is the reduced mass $m_a m_b/(m_a + m_b)$ where $m_b$ is the mass of atmospheric gas molecule, $P_b$ is the pressure (Pa) of atmospheric gas, and $d_{ab}$ is an average diameter of the vaporized molecule and the atmospheric gas molecule.

The formulas (2) and (3) indicate that the collision frequency t/τ depends on both the pressure Pb of atmospheric gas and the substrate-evaporation source distance LTS.

Figure 8:
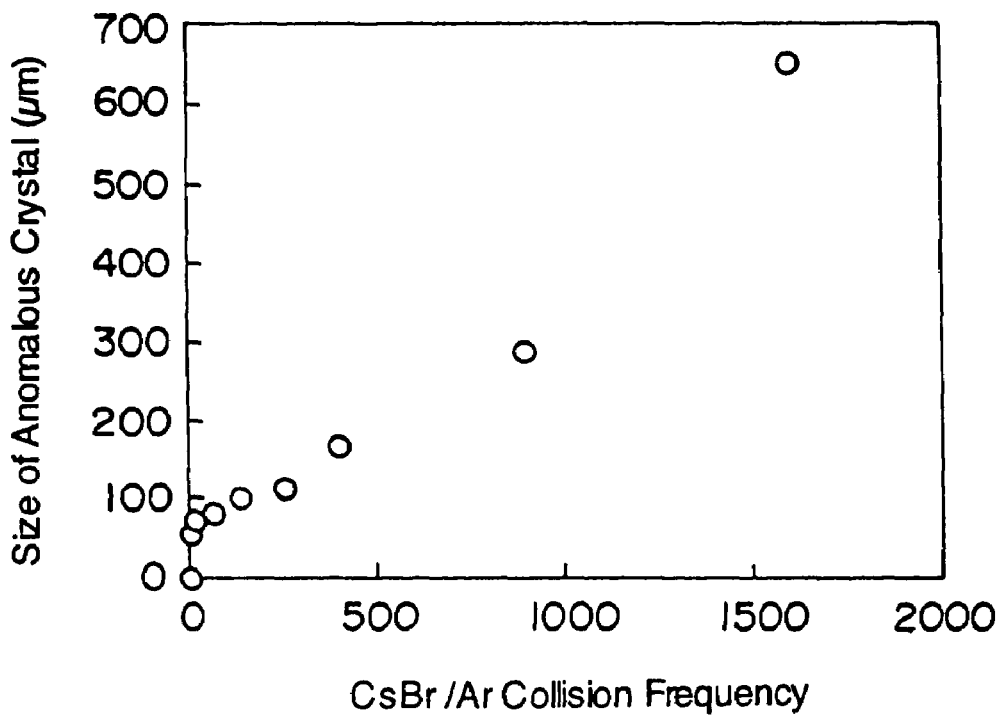
FIG. 8 is a graph showing the relationship between the size of anomalous crystal and how many times a CsBr vaporized particle comes into collision with an Ar gas molecule (i.e., collision frequency).

FIG. 8 is a graph showing the relationship between the diameter of anomalous column at the top surface (μm) and the collision frequency between a CsBr vaporized particle and an atmospheric gas (Ar gas) molecule. FIG. 8 indicates that the collision frequency is preferably not more than 1,000.

In other words, the vaporized particles come into collision with the atmospheric gas molecule preferably at least once and at most 1,000 times before deposited on the substrate. If the vaporized particles do not come into collision (namely, if the collision frequency is 0), the deposited layer is not constituted of individually standing columnar crystals. Accordingly, the distance between the substrate and each source is generally in the range of 10 to 1,000 mm though depending on various conditions such as the size of substrate. The distance between the sources is generally set to a value in the range of 10 to 1,000 mm.

The evaporation sources are then vaporized using resistance heaters (i.e., according to a resistance heating method). The resistance heating method is advantageous because the evaporation-deposition procedure can be carried out in a medium vacuum and also because a phosphor layer consisting of good columnar crystals can be readily formed. Successively after the pretreatment, the container 6a is heated to the vaporizing temperature T° C. At the same time, an electric current is supplied to the resistance heater 7 to heat the container 7a, and thereby the vapor flow is stabilized so that the phosphor can be deposited and accumulated at a constant rate to form an even deposited layer.

The sources of matrix and activator materials are thus heated, vaporized, reacted with each other to form the phosphor, which is deposited and accumulated on the substrate 4. In this step, the substrate 4 may be heated or cooled from the back. The temperature of the substrate is generally in the range of 20 to 350° C., preferably in the range of 100 to 300° C. The deposition rate can be controlled by adjusting the electric currents supplied to the heaters. The deposition rate of each vaporized phosphor component can be detected with the monitor 9 at any times during the deposition. The deposition rate, which means how fast the phosphor is accumulated, is generally in the range of 0.1 to 1,000 μm/min., preferably in the range of 1 to 100 μm/min.

The heating using the resistance-heating units may be repeated twice or more to form two or more phosphor layers. After the deposition procedure is complete, the deposited layer may be subjected to heating treatment (i.e., annealing treatment), which is carried out generally at a temperature of 100 to 300° C. for 0.5 to 3 hours, preferably at a temperature of 150 to 250° C. for 0.5 to 2 hours, in an inert gas atmosphere which may contain a small amount of oxygen gas or hydrogen gas.

Before preparing the above deposited phosphor layer, another deposited layer consisting of the phosphor matrix alone may be beforehand formed. The phosphor matrix deposited layer generally comprises the matrix in the form of columnar crystals or aggregates of spherical crystals, and it enables the thereon-formed phosphor to crystallize well in the form of columnar shape. In thus formed layers, the additives such as the activator contained in the phosphor-deposited layer are often diffused into the matrix alone-deposited layer while they are heated during the deposition and/or during the heating treatment performed after the deposition, and consequently the interface between the layers is not always clear.

In the case where the phosphor layer is produced by mono-vapor deposition, only one evaporation source containing the phosphor itself or a mixture of constitutional materials thereof (which react with each other to produce the phosphor) is heated using a single resistance-heating unit. The evaporation source is beforehand prepared so that it may contain the activator in a desired amount. Otherwise, in consideration of vapor pressure difference between the matrix components and the activator, the deposition procedure can be carried out while the matrix components are being supplied to the evaporation source.

Thus produced phosphor layer consists of phosphor in the form of columnar crystals grown almost in the thickness direction, and there is no anomalously grown phosphor column. In the phosphor layer, there are gap among the phosphor columns. The thickness of the phosphor layer depends on, for example, desired characteristics of the storage panel, conditions and process of the deposition, but is normally in the range of 50 μm to 1 mm, preferably in the range of 200 to 700 μm.

It is not necessary for the substrate to be used as a support of the radiation image storage panel. For example, after formed on the substrate, the deposited phosphor film is peeled from the substrate and then placed on a support with an adhesive to prepare the phosphor layer.

The gas phase-accumulation method employable in the invention is not restricted to the above-described vapor-deposition method performed using a resistance heater, and various other known methods such a vapor-deposition method using an electron beam, a sputtering method and a CVD method can be used.

It is preferred to provide a protective layer on the surface of the phosphor layer, so as to ensure good handling of the storage panel in transportation and to avoid deterioration. The protective layer is preferably transparent so as not to prevent the stimulating light from coming in or not to prevent the emission from coming out. Further, for protecting the storage panel from chemical deterioration and physical damage, the protective layer preferably is chemically stable, physically strong, and of high moisture proof.

EXAMPLE 1

(1) Evaporation Source

As the evaporation sources, powdery cesium bromide (CsBr, purity: 4N or more, melting point: 636° C.) and powdery europium bromide (EuBr$_2$, purity: 3N or more) were prepared. Each evaporation source was analyzed according to ICP-MS method (Inductively Coupled Plasma Mass Spectrometry), to detect impurities. As a result, the CsBr powder was found to contain each of the alkali metals (Li, Na, K, Rb) other than Cs in an amount of 10 ppm or less and other elements such as alkaline earth metals (Mg, Ca, Sr, Ba) in amounts of 2 ppm or less. The EuBr$_2$ was also found to contain each of the rare earth elements other than Eu in an amount of 20 ppm or less and other elements in amounts of 10 ppm or less. These evaporation sources are very hygroscopic, and hence were stored in a desiccator kept under a dry condition whose dew point was −20° C. or below. Immediately before used, they were taken out of the desiccator.

(2) Preparation of Phosphor Layer

A glass substrate 4 as a support was washed successively with an alkaline solution, purified water and isopropyl alcohol. Thus treated substrate was mounted to a substrate holder 3 in an evaporation-deposition apparatus shown in FIG. 4. The CsBr and EuBr$_2$ evaporation sources were individually placed in crucibles 6a and 7a equipped with resistance heaters 6 and 7, respectively. The distance between the substrate 4 and each evaporation source was 150 mm. The chamber 1 of the apparatus was then evacuated through the main exhaust valve 12 and the auxiliary exhaust valve 13, to make the inner pressure 1×10$^{-3}$ Pa by means of a combination of a rotary pump, a mechanical booster and a turbo molecular pump, and successively Ar gas (purity: 5N) was introduced through the intake pipe 8 to set the inner pressure at 1.0 Pa (Ar gas pressure). The substrate 4 was then heated to 100° C. by means of the substrate heater 2.

The shutter 5 (which was placed between the substrate 4 and each evaporation source) was closed, and then an electric current of 50 A was supplied to the heating unit 6 for 10 minutes so as to heat the CsBr source in the crucible 6a at approx. 300° C. The electric current was changed into 70 A, so that the temperature of the evaporation source (temperature near the inner wall of the crucible) was 700° C., which was kept for 15 minutes so as to melt the whole CsBr evaporation source. The temperature distribution in the melted CsBr source (i.e., difference between the temperatures at the center and at the periphery of the melted source) in the crucible 6a was found 1° C. The electric current was again changed into 65 A and kept for 10 minutes, so that the temperature in the crucible 6a was 680° C. (vaporizing temperature). The pretreatment was thus completed.

The crucible 7a filled with the EuBr$_2$ was heated using the resistance heater 7, and then only the shutter 5 covering the CsBr source was opened, so that CsBr phosphor matrix was alone accumulated on the substrate 4 to form a layer of phosphor matrix. After 3 minutes, the other shutter 5 covering the EuBr$_m$ source was opened, so that CsBr:Eu stimulable phosphor was accumulated on the matrix layer. The deposition rate was 10 μm/min. During the deposition, the electric currents supplied to the heaters 6 and 7 were controlled so that the molar ratio of Eu/Cs in the stimulable phosphor might be 0.003/1. After the evaporation-deposition was complete, the inner pressure was returned to atmospheric pressure and then the substrate was taken out of the apparatus. On the substrate, a stimulable phosphor layer (thickness: 500 μm, area: 10 cm×10 cm) consisting of columnar phosphor crystals aligned densely and almost perpendicularly was formed. The collision frequency in this procedure (namely, how many times a particle of the substance vaporized from the evaporation source came into collision with an atmospheric gas molecule in the evaporation-deposition apparatus before deposited on the substrate) was 506 (calculated value). Thus, a radiation image storage panel of the invention having a support and a phosphor layer was produced by multi-vapor deposition.

EXAMPLE 2

The procedures of Example 1 were repeated except that the temperature of the evaporation source in the pretreatment was set at 700° C., which was kept for 10 minutes so as to melt the whole CsBr evaporation source, to produce a radiation image storage panel of the invention. The difference between the temperatures at the center and at the periphery of the melted source was 3° C.

EXAMPLE 3

The procedures of Example 1 were repeated except that the temperature of the evaporation source in the pretreatment was set at 700° C., which was kept for 5 minutes so as to melt the whole CsBr evaporation source, to produce a radiation image storage panel of the invention. The difference between the temperatures at the center and at the periphery of the melted source was 10° C.

EXAMPLE 4

The procedures of Example 1 were repeated except that the electric current in the pretreatment was changed from 70 A to 75 A, so that the temperature of the evaporation source was set at 775° C., which was kept for 5 minutes so as to melt the whole CsBr evaporation source, to produce a radiation image storage panel of the invention. The difference between the temperatures at the center and at the periphery of the melted source was 24° C.

EXAMPLE 5

The procedures of Example 1 were repeated except that the apparatus was evacuated to make the inner pressure 0.13× 10$^{-3}$ Pa and that the temperature of the evaporation source in the pretreatment was set at 685° C., which was kept for 3 minutes so as to melt the whole CsBr evaporation source, to produce a radiation image storage panel of the invention. The difference between the temperatures at the center and at the periphery of the melted source was 29° C. The collision frequency in the deposition procedure was 9 (calculated value).

EXAMPLE 6

The procedures of Example 1 were repeated except that the apparatus was evacuated to make the inner pressure 0.67× 10$^{-3}$ Pa and that the temperature of the evaporation source in the pretreatment was set at 685° C., which was kept for 3 minutes so as to melt the whole CsBr evaporation source, to produce a radiation image storage panel of the invention. The collision frequency in the deposition procedure was 225 (calculated value).

EXAMPLE 7

The procedures of Example 1 were repeated except for performing the pretreatment in the following manner, to produce a radiation image storage panel of the invention.

An electric current of 50 A was supplied to the heating unit 6 for 10 minutes so as to heat the CsBr source in the crucible 6a at approx. 300° C. The electric current was changed into 60 A, so that the temperature of the evaporation source (temperature near the inner wall of the crucible) was 640° C., which was kept for 60 minutes so as to melt the whole CsBr evaporation source. The electric current was again changed into 65 A and kept for 30 minutes, so that the temperature in the crucible became 680° C. (vaporizing temperature). The difference between the temperatures at the center and at the periphery of the melted source was found 0° C.

COMPARISON EXAMPLE 1

The procedures of Example 1 were repeated except that the pretreatment was not performed, to produce a radiation image storage panel for comparison.

Evaluation of Radiation Image Storage Panel

Each produced radiation image storage panel was evaluated in the following manner.

(1) Anomalous Crystal (Hillock) in Phosphor Layer

The phosphor layer surface of each storage panel was observed with a scanning electron microscope (JSM-5400, JEOL) to obtain an electron micrograph. In the electron micrograph, it was checked whether the layer had an anomalous crystal (i.e., phosphor column having an anomalous diameter) or not. The phosphor column having the largest top surface was examined to measure its size (diameter).

(2) Point Defect

Each radiation image storage panel was encased in a room light-shielding cassette and then exposed to X-rays (10 mR). After the panel was taken out of the cassette, the stored image information was read out by means of a line-scan reading apparatus [stimulating rays: Ne—Ne laser beam (633 nm), light-receiving size of CCD=pixel size: 100 μm]. The obtained information was processed in an image-reproducing apparatus [image size: 200 μm] and output in the form of an image film. The output film was observed with the unaided eyes by ten monitoring persons, and number noting point defects was counted.

The results are set forth in Table 1.

TABLE 1

| Ex. | Pretreatment | Largest diameter | Number of persons noting point defects |
|---|---|---|---|
| Ex. 1 | 700° C., 15 min. | 20 μm | 0/10 |
| Ex. 2 | 700° C., 10 min. | 30 μm | 0/10 |
| Ex. 3 | 700° C., 5 min. | 50 μm | 0/10 |
| Ex. 4 | 775° C., 5 min. | 150 μm | 2/10 |
| Ex. 5 | 685° C., 3 min. | 70 μm | 1/10 |
| Ex. 6 | 685° C., 3 min. | 100 μm | 1/10 |
| Ex. 7 | 640° C., 60 min. | 30 μm | 0/10 |
| Com. Ex. 1 | — | 650 μm | 10/10 |

The results shown in Table 1 clearly indicate that the phosphor layer of each radiation image storage panel of the invention (Examples 1 to 7) produced by the process of the invention, in which the evaporation source was subjected to the pretreatment, contained no anomalous crystal larger than 200 μm and hence gave a practically satisfying radiation image reproduced on the image film. In contrast, the conventional radiation image storage panel (Comparison example 1) produced by the known process, in which the evaporation source was not subjected to the pretreatment, had a phosphor layer containing an anomalous crystal much larger than 200 μm and hence gave a practically unsatisfactory radiation image.

What is claimed is:

1. A process for preparation of the phosphor panel formed on a substrate by a gas phase-accumulation method, wherein the phosphor layer comprises a large number of phosphor columns standing parallel to each other, in which the phosphor columns have a mean diameter in the range of 0.1 to 50 μm at a top surface thereof, and there are no phosphor columns having a diameter larger than 200 μm at the top surface, comprising the steps of:

placing, in a vacuum evaporation-deposition apparatus, a container containing an evaporation source containing phosphor or a constitutional materials thereof, evacuating the evaporation-deposition apparatus to set an inner atmosphere thereof at a pressure in the range of 0.1 to 10 Pa, preheating the container to melt whole evaporation source at the above-mentioned pressure range, and vaporizing the evaporation source to deposit on a substrate a phosphor layer having predetermined thickness.

2. The process of claim 1 wherein at least two evaporation sources are used, in which one of the sources contains compounds for forming matrix of the phosphor and the other contains an activator of the phosphor, comprising the steps of:

preheating at least one evaporation source for forming matrix to melt completely the evaporation source, and vaporizing both of the evaporation source for forming matrix and evaporation source containing an activator to deposit on the substrate a phosphor layer having predetermined thickness.

3. The process of claim 1, wherein the step of preheating the container to melt whole evaporation source is performed under such condition that a temperature of the evaporation source at a center area differs from a temperature of the evaporation source at a peripheral area by not larger than 30° C.

4. The process of claim 1, wherein the step of vaporizing the evaporation source is performed by means of a resistance-heater.

5. The process of claim 1, wherein particles of the vaporized evaporation source come into collision with an atmospheric gas molecule in the evaporation-deposition apparatus at 1 to 1,000 times before the particles are deposited on the substrate.

* * * * *